United States Patent [19]
Chen

[11] Patent Number: 6,163,659
[45] Date of Patent: Dec. 19, 2000

[54] SCANNING STATUS INDICATING DEVICE FOR AUTOMATIC DOCUMENT FEEDER

[75] Inventor: Sun Chen, Shin-Chu, Taiwan

[73] Assignee: Mustek Systems, Inc., Sin-Chu, Taiwan

[21] Appl. No.: 09/413,506

[22] Filed: Oct. 6, 1999

[51] Int. Cl.[7] .............................. G03G 15/00; H04N 1/04
[52] U.S. Cl. .............................. 399/17; 358/488; 399/367
[58] Field of Search .................................. 399/81, 17, 16, 399/9, 361, 365, 367, 371, 377, 379, 380, 107; 358/474, 475, 488; 40/453, 341; 400/605

[56] References Cited

U.S. PATENT DOCUMENTS 5,537,219  7/1996  Morikawa et al. ................. 358/475 X
5,727,890  3/1998  Stodder et al. ..................... 400/605 X Primary Examiner—Sophia S. Chen
Attorney, Agent, or Firm—McGuireWoods, LLP

[57] ABSTRACT

The present invention provides an automatic document-feeding device. The device includes a scanning area facing the scanner; a document-feeding path for transmitting therein a document to the scanning area to be scanned by the scanner; a document urging device for urging the document to be moved within the document-feeding path; and a scanning status indicating device connecting to the document-feeding path for changing a brightness situation when the document is passing to be observed by a user.

8 Claims, 4 Drawing Sheets

SCANNING STATUS INDICATING DEVICE FOR AUTOMATIC DOCUMENT FEEDER

BACKGROUND OF THE INVENTION

1. Field of the Invention

The present invention relates to a status-indicating device, and more particularly to a scanning status-indicating device for an automatic document feeder.

2. Description of the Prior Art

Scanners are widely used in computer image processing. Basically, scanners include sheet-feed scanners and flatbed scanners. The flatbed scanners usually have higher scanning quality and are preferred by the users. However, using a flatbed scanner is troublesome when a lot of documents are to be scanned. Accordingly, an automatic document feeder (ADF) is developed to be used with a flatbed scanner. The ADF can automatically feed document sheets one by one to the flatbed scanner to be scanned.

Referring to FIG. 1, a conventional ADF 1 includes a body shell 11, a document-feeding path 10 formed on the bottom side of the body shell 11, and rollers 14, 16, 18 and 20 for urging the document sheet to be moved in the feed path 10. The document-feeding path 10 is formed by an inner shell 102 and an outer shell 104. The document-feeding path 10 further includes a scanning area 12, which is an opening formed on the bottom of the outer shell 104. A document 34 is urged by the rollers 14, 16, 18 and 20 to be moved in the document-feeding path 10. The document 34 enters the document-feeding path 10 from the entry 24 and leaves it from the outlet 26. The ADF 1 is mounted on a flatbed scanner 40 and the scanning area 12 is aligned to the reading unit (not shown) of the scanner 40. While the document 34 passes through the scanning area 12, it will be scanned by the scanner 40.

While being scanned, the document 34 is illuminated by the light source 28. However, since the scanner 40 is covered by the automatic document feeder 1, the scanning process cannot be observed and monitored by the user.

It is then desirable to have the scanning process being observed by the user.

SUMMARY OF THE INVENTION

An object of the present invention is to provide an ADF having a scanning status indicating device.

According to the present invention, an automatic document feeder adapted to be used with a scanner having a light source is provided. The automatic document feeder includes: a scanning area facing the scanner; a document-feeding path for transmitting therein a document to the scanning area to be scanned by the scanner; a document urging device for urging the document to be moved within the document-feeding path; and a scanning status indicating device connecting to the document-feeding path for changing a brightness situation when the document is passing to be observed by a user.

The automatic document feeding device preferably includes an inner shell and an outer shell, and the document-feeding path is formed by the inner shell and the outer shell.

The scanning status indicating device preferably includes a light-acquiring structure formed on the outer shell for acquiring a light emitted from the light source of the scanner; and a light-guiding structure mounted on the inner shell for receiving and transmitting the light acquired by the light-acquiring structure.

The light-acquiring structure preferably includes a first hole formed on the outer shell for allowing the light emitted from the light source to pass therethrough. The first hole is preferably covered by a transparent material.

The light-guiding structure preferably includes a light-introducing portion formed on the inner shell opposing to the light-acquiring structure for introducing the light acquired by the light-acquiring structure; and a light-indicating portion for receiving therein the light introduced by the light-introducing portion to be indicated to a user.

The light-introducing portion includes a second hole formed on the inner shell of the automatic document feeding device; and a light-introducing element inserted within the second hole.

The automatic document feeding device preferably further includes a body shell, and the light-indicating portion includes a third hole formed on the body shell; a light-guiding element received within the third hole for guiding the light introduced by the light-introducing portion; and a lens mounted on the top of the light-guiding element for helping a user to observe the light received by the light-guiding element.

The light-guiding structure preferably further includes a light-transmitting device connected between the light-introducing portion and the light-indicating portion for transmitting the light introduced by the light-introducing portion to the light-indicating portion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
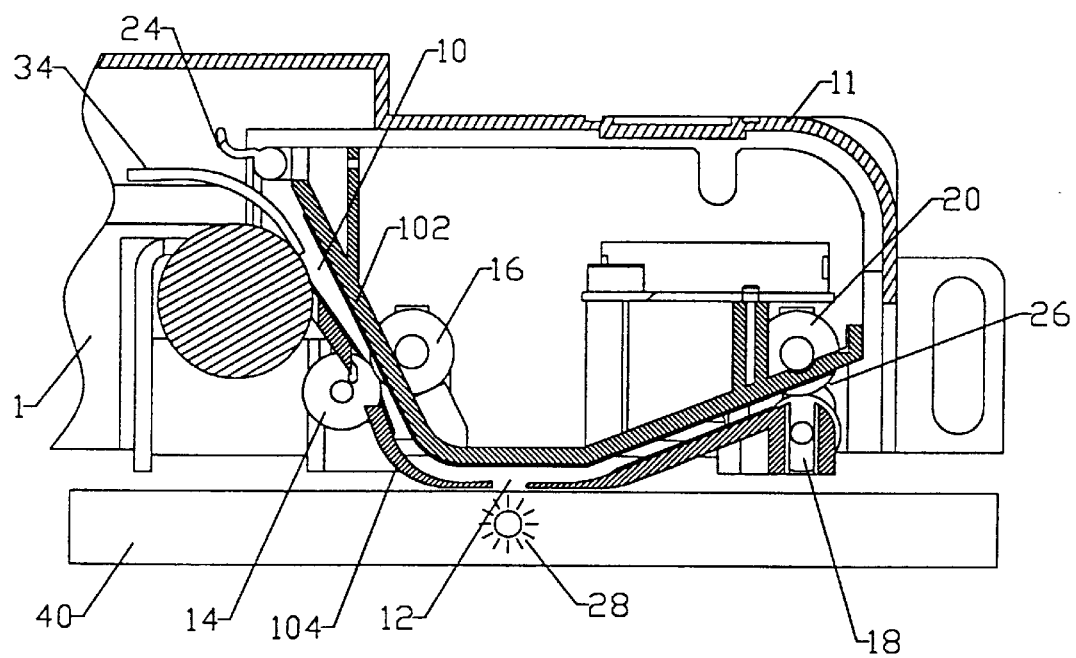
FIG. 1 illustrates a conventional automatic document feeder.
Figure 2A:
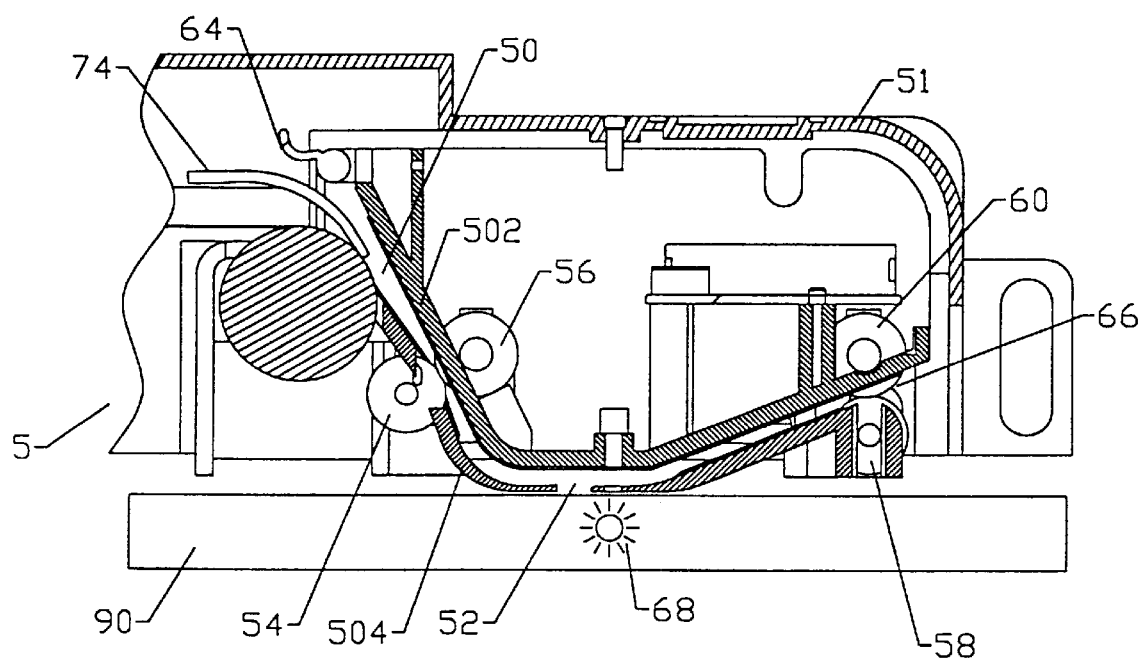
FIG. 2(a) illustrates an automatic document feeder having a scanning status indicating device.
Figure 2B:
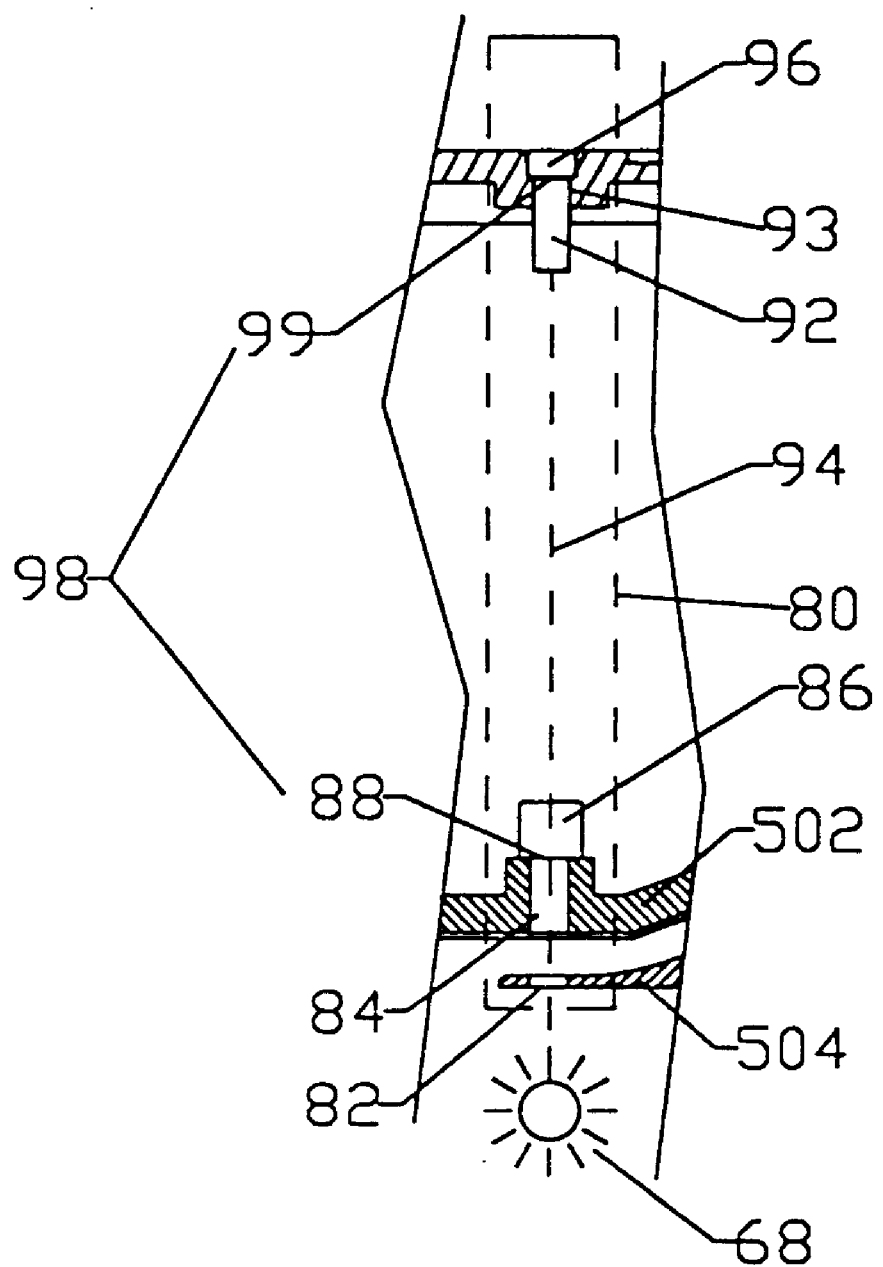
FIG. 2(b) is a partially enlarged view of FIG. 2(a) illustrating the scanning status indicating device according to the present invention.

FIG. 2(a) shows an ADF 5 having a scanning status-indicating device. The ADF 5 includes a body shell 51, a document-feeding path 50 formed on the bottom side of the body shell 51, and an urging device which includes rollers 54, 56, 58 and 60 for urging document sheets to be moved in the feeding path 50. Of course, these rollers are connected to at least one motor (not shown) or other driving device. The document-feeding path 50 is formed by an inner shell 502 and an outer shell 504 of the ADF 5. The document-feeding path 50 further includes a scanning area 52, which is an opening formed on the bottom of the outer shell 504. A document 74 is urged by the rollers 54, 56, 58 and 60 to be moved in the document-feeding path 50. The document 74 enters the document-feeding path 50 from the entry 64 and leaves it from the outlet 66. The ADF 5 is mounted on a flatbed scanner 90, and the scanning area 52 is aligned to the reading unit (not shown) of the scanner 90. When the document 74 passes through the scanning area 52, it will be scanned by the scanner 90. A light source 68 is provided within the scanner 90 to illuminate the scanned document.

The scanning status indicating device 80 includes a light-acquiring structure 82 and a light-guiding structure 98 having a light-introducing portion 88 and a light-indicating portion 99. Both the light-acquiring structure 82 and the light-guiding structure 98 are located on a light-illuminating path 94 of the light source 68. The light-acquiring structure 82 is a hole formed on the outer shell 504 and allowing the light emitted from the light source 68 to pass therethrough. The light-acquiring structure 82 may be covered by any transparent material. The light-introducing portion 88 includes a hole 84 formed on the inner shell 502 and a light-introducing element 86 inserted within the hole 84. The light-indicating portion 99 is mounted on a portion of the ADF 5 capable of being observed by the user. The light-indicating portion 99 includes a hole 93 formed on the body shell 51 of the ADF 5, a light-guiding element 92 received within the hole 93, and a lens 96 mounted on the top of the light-guiding element 92.

The light emitted from the light source 68 alone the light-illuminating path 94 will be received by the light-acquiring structure 82. In a first situation, the portion of the document-feeding path 50 between the light-acquiring structure 82 and the light-guiding structure 98 is empty. Accordingly, the light emitted from the light source 68 will be transmitted from the light acquiring structure 82 to the light-introducing element 86 of the light-guiding structure 98. The light is then transmitted from the light-introducing element 86 alone the light-illuminating path 94 to the light-guiding element 92. The lens 96 can help the user to observe the light transmitted to the light-guiding element 92.

In a second situation, when the document 74 passes through the portion of the document-feeding path 50 between the light-acquiring structure 82 and the light-guiding structure 98, the light emitted from the light source 68 will be interdicted by the document 74. Accordingly, the light receiving portion 99 will be darkened. The light-acquiring structure 82 and the light-guiding structure 98 are mounted near the scanning area 52 so that the scanning procedure can be observed. Furthermore, the glisten of the light receiving portion 99 will bring a pleasure to the user.

Figure 3:
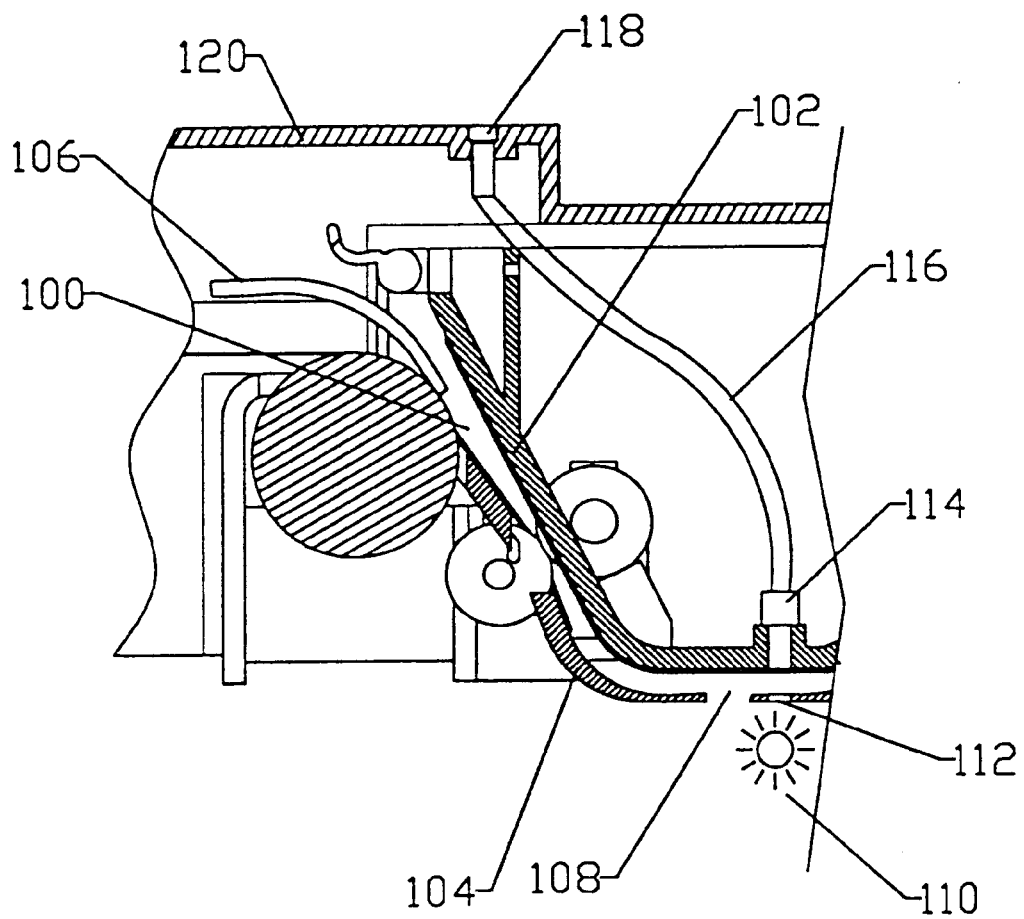
FIG. 3 illustrates another embodiment of an automatic document feeder according to the present invention.

The light-receiving portion is not necessarily located on the light-emitting path of the light source. Referring to FIG. 3, a document-feeding path 100 is formed by an inner shell 102 and an outer shell 104. A document 106 is transmitted within the document-feeding path 100 to be scanning at the scanning area 108. The light emitted from the light source 110 is received by the light-acquiring structure 112. When the document 106 is not passing, the light-introducing portion 114 will receive the light emitted from the light acquiring structure 112. In stead of emitting the light directly, the light received by the light-introducing portion 114 is transmitted through the light-transmitting device 116 to the light-indicating portion 118. The light-indicating portion 118 is formed on the body shell 120 and is not on the light-emitting path of the light source 110. However, the progressing direction of the light can be changed by the light-transmitting device 116. The light transmitting device 116 can be an optical rod or other light-transmittable devices.

To sum up, the present invention provides a scanning status indicating device for indicating the scanning status of a document in a document-feeding path. The scanning status indicating device introduces the light emitted from the light source of a scanner to be observed by the user and is darkened when a document is passing. Accordingly, the scanning process can be observed by the user. Furthermore, the variance of the brightness/darkness status of the scanning status indicating device will amuse the user during the scanning process. Accordingly, the present invention is valuable for the industry.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeding device adapted to be used with a scanner having a light source, comprising
    a scanning area facing said scanner;
    a document-feeding path for transmitting therein a document to said scanning area to be scanned by said scanner;
    a document urging device for urging said document to be moved within said document-feeding path; and
    a scanning status indicating device connecting to said document-feeding path for changing a brightness situation when said document is passing to be observed by a user.

2. A device according to claim 1 wherein said automatic document feeding device includes an inner shell and an outer shell, and said document-feeding path is formed by said inner shell and said outer shell.

3. A device according to claim 2 wherein said scanning status indicating device includes:
    a light-acquiring structure formed on said outer shell for acquiring a light emitted from said light source of said scanner; and
    a light-guiding structure mounted on said inner shell for receiving and transmitting said light acquired by said light-acquiring structure.

4. A device according to claim 3 wherein said light-acquiring structure includes:
    a first hole formed on said outer shell for allowing said light emitted from said light source to pass therethrough.

5. A device according to claim 3 wherein said light-guiding structure includes:
    a light-introducing portion formed on said inner shell opposing to said light-acquiring structure for introducing said light acquired by said light-acquiring structure; and
    a light-indicating portion for receiving therein said light introduced by said light-introducing portion to be indicated to a user.

6. A device according to claim 5 wherein said light-introducing portion includes:
    a second hole formed on said inner shell of said automatic document feeding device; and
    a light-introducing element inserted within said second hole.

7. A device according to claim 5 wherein said automatic document feeding device further includes a body shell, and said light-indicating portion includes:

a third hole formed on said body shell;

a light-guiding element received within said third hole for guiding said light introduced by said light-introducing portion; and a lens mounted on the top of said light-guiding element for helping a user to observe said light received by said light-guiding element.

8. A device according to claim 5 wherein said light-guiding structure further includes a light-transmitting device connected between said light-introducing portion and said light-indicating portion for transmitting said light introduced by said light-introducing portion to said light-indicating portion.

* * * * *